Oct. 17, 1961 G. BILLI 3,004,414
DOUBLE FEED APPARATUS FOR CIRCULAR HOSIERY MACHINE
TO PRODUCE PLAIN AND TUCK STITCHES
Filed April 23, 1957 11 Sheets-Sheet 1

INVENTOR:
GIORGIO BILLI

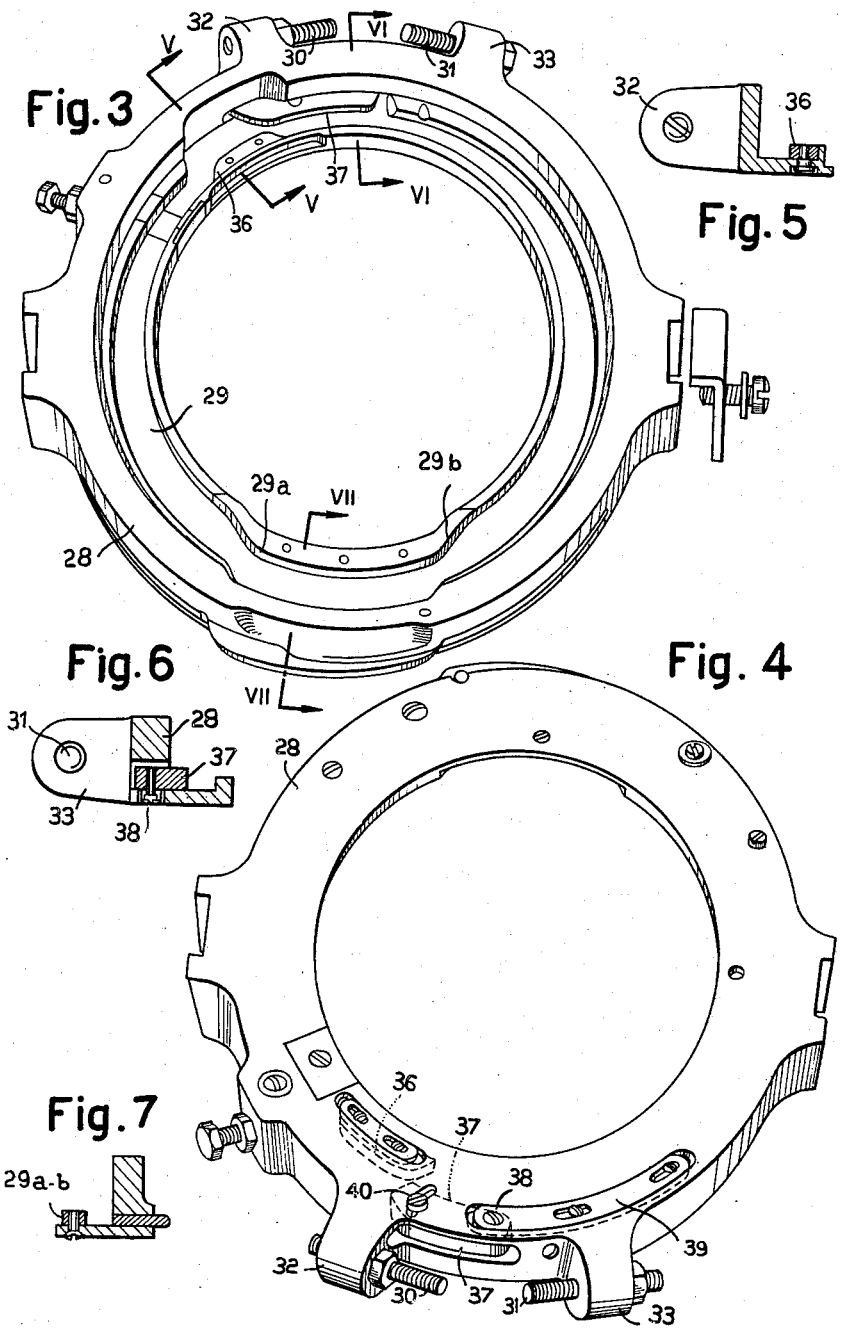

Oct. 17, 1961 G. BILLI 3,004,414
DOUBLE FEED APPARATUS FOR CIRCULAR HOSIERY MACHINE
TO PRODUCE PLAIN AND TUCK STITCHES
Filed April 23, 1957 11 Sheets-Sheet 3

INVENTOR:
GIORGIO BILLI
By
Richardson, David and Nedon
ATTYS.

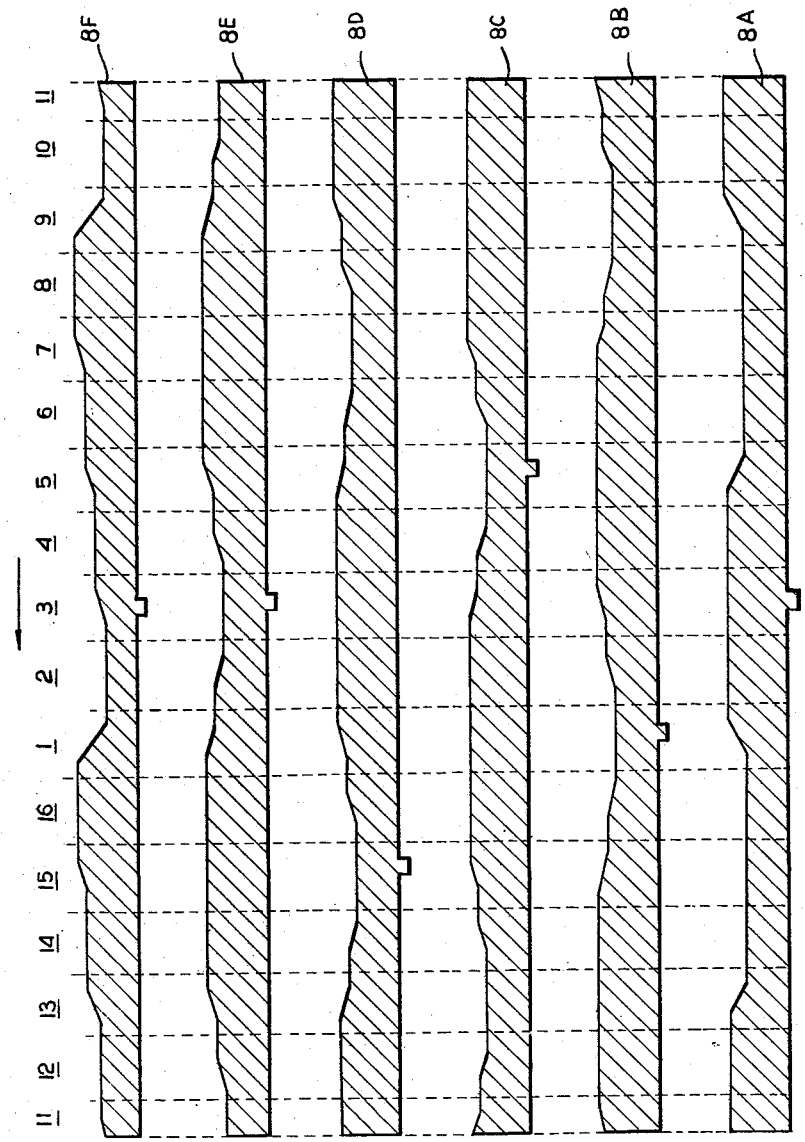

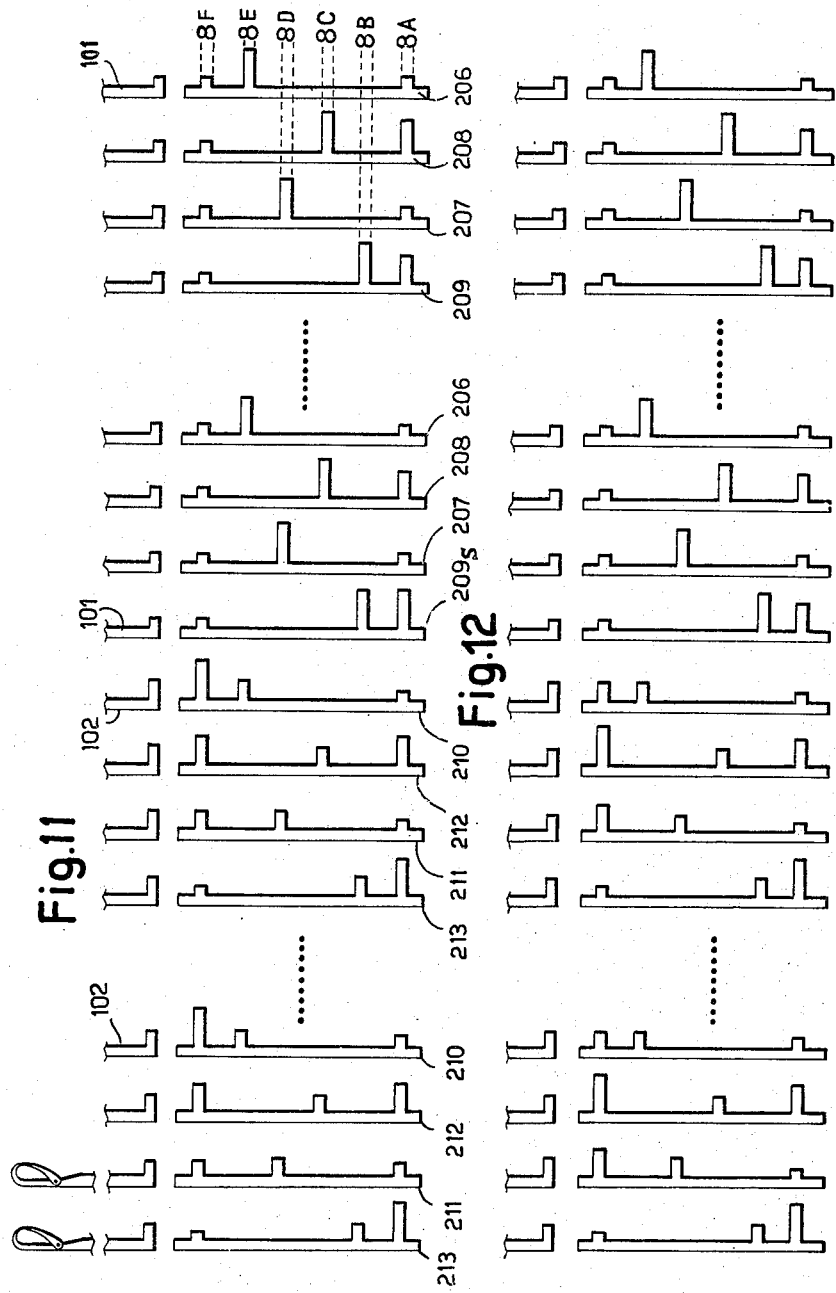

Oct. 17, 1961 G. BILLI 3,004,414
DOUBLE FEED APPARATUS FOR CIRCULAR HOSIERY MACHINE
TO PRODUCE PLAIN AND TUCK STITCHES
Filed April 23, 1957 11 Sheets-Sheet 6
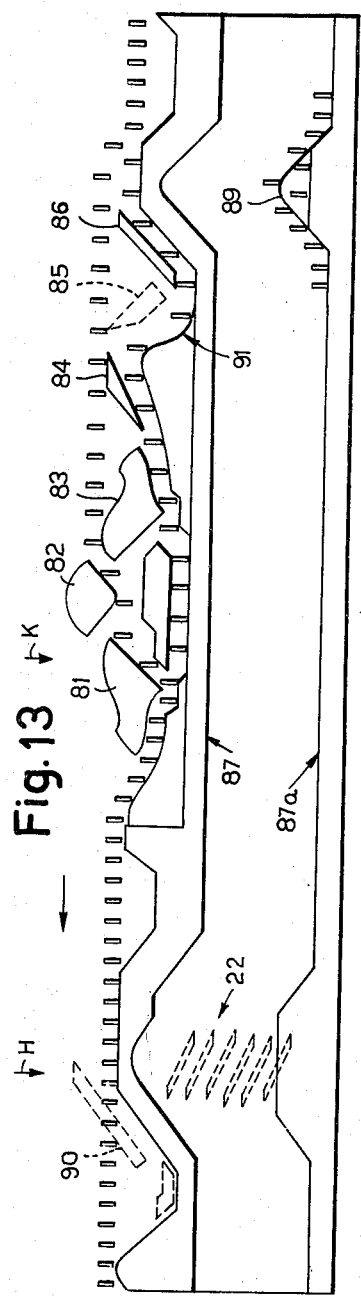
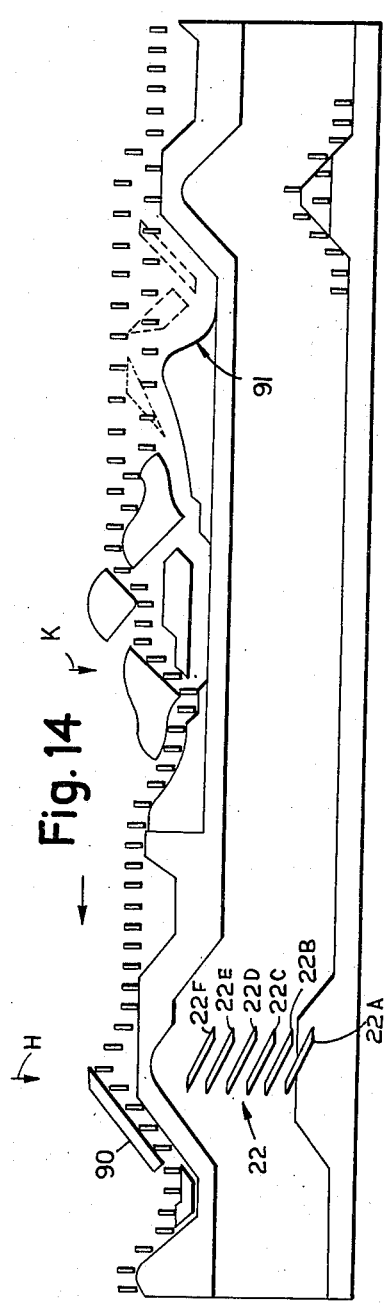
INVENTOR:
GIORGIO BILLI
By
Richardson, David and Nerdon
Atty's.

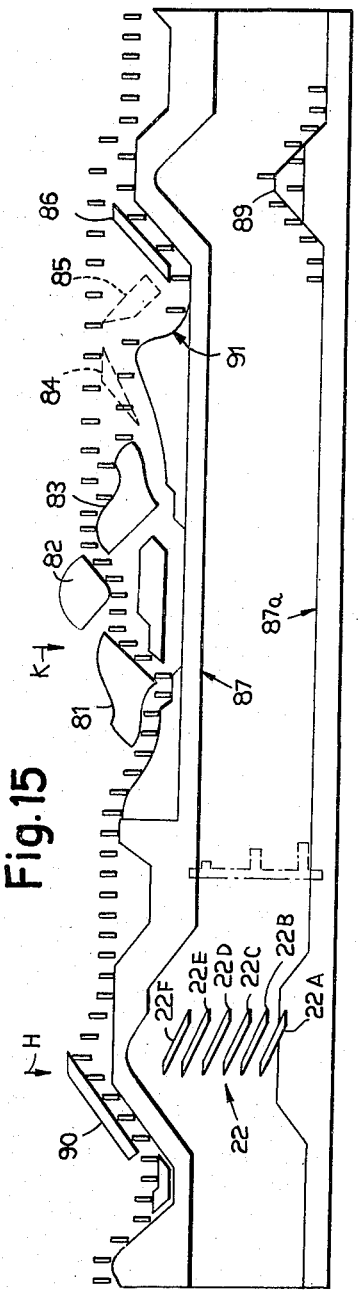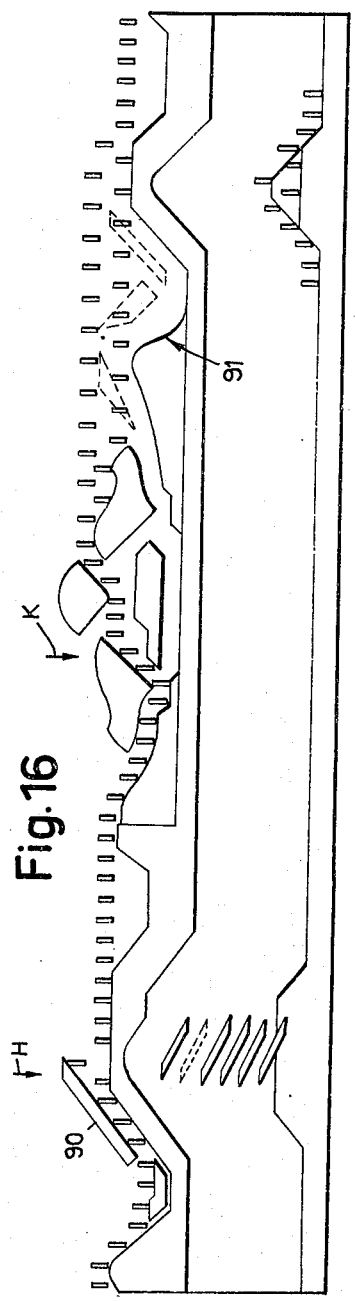

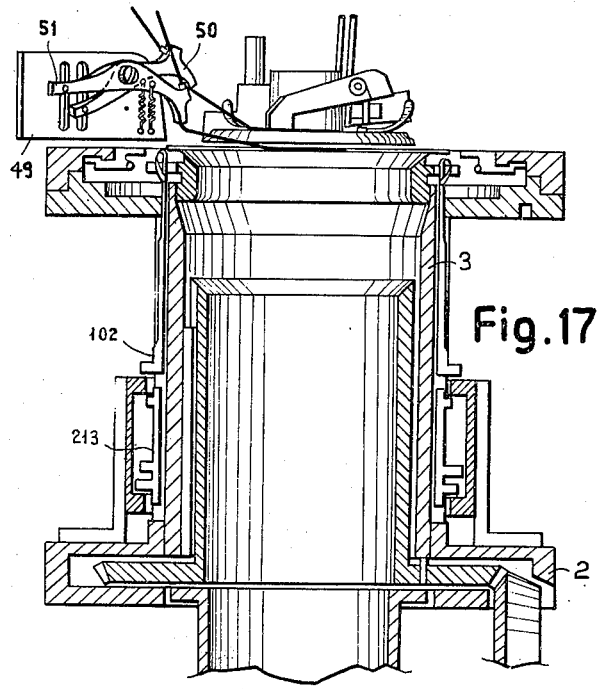
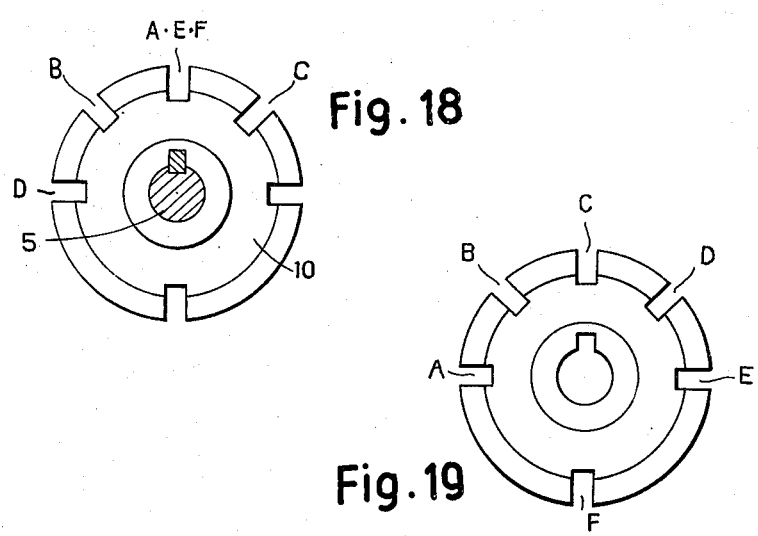

Oct. 17, 1961 G. BILLI 3,004,414
DOUBLE FEED APPARATUS FOR CIRCULAR HOSIERY MACHINE
TO PRODUCE PLAIN AND TUCK STITCHES
Filed April 23, 1957 11 Sheets-Sheet 9

INVENTOR:
GIORGIO BILLI
By
Richardson, David and Nordon
ATTYs.

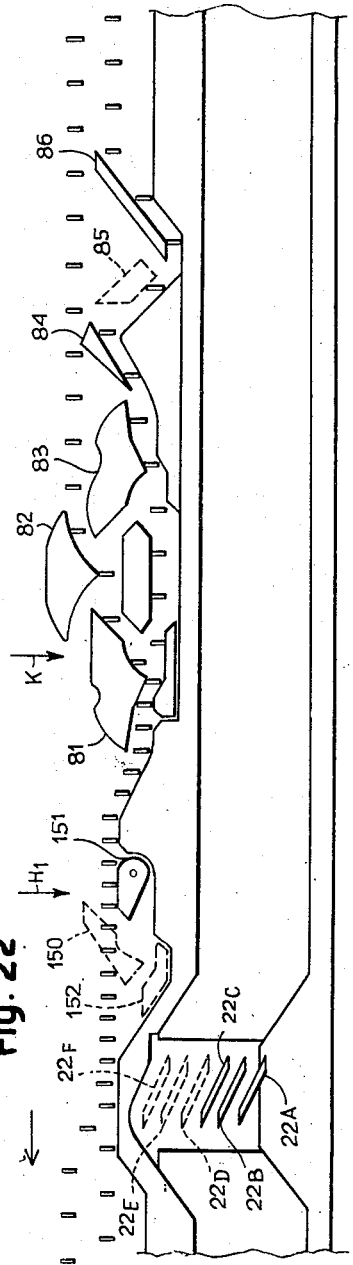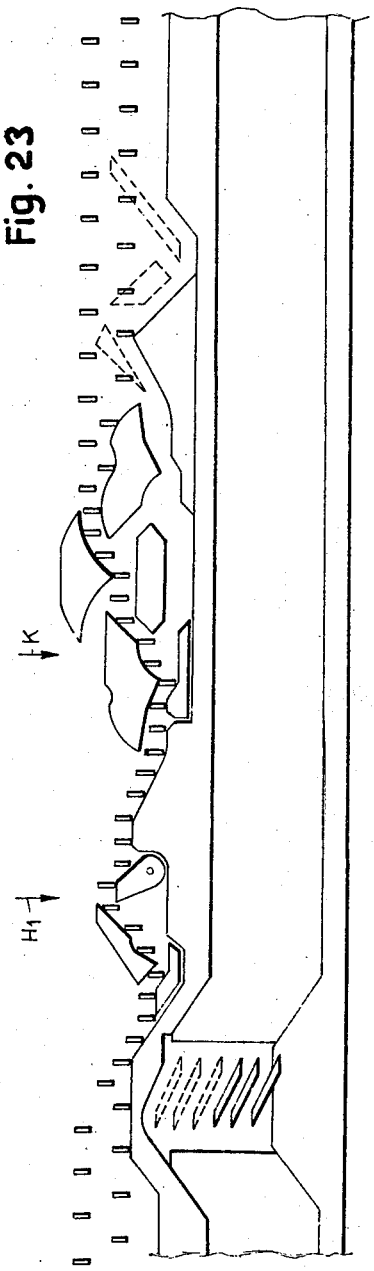

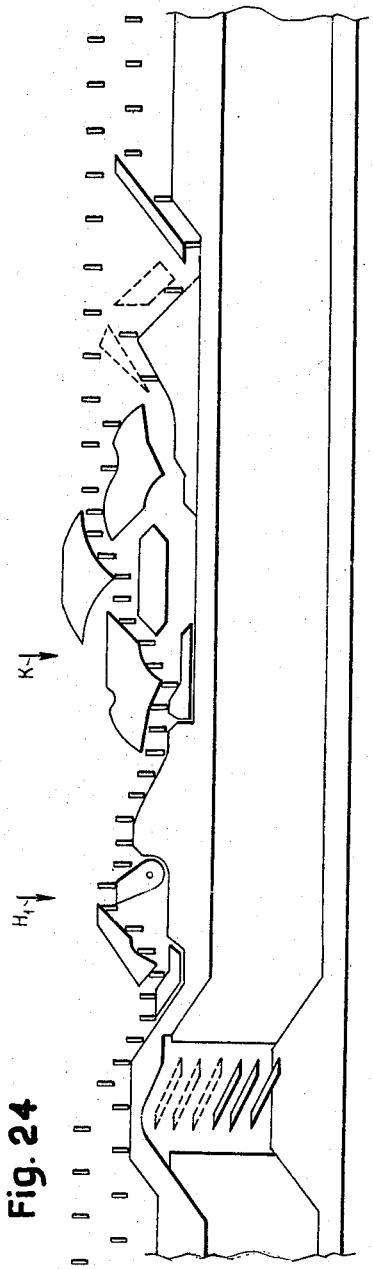
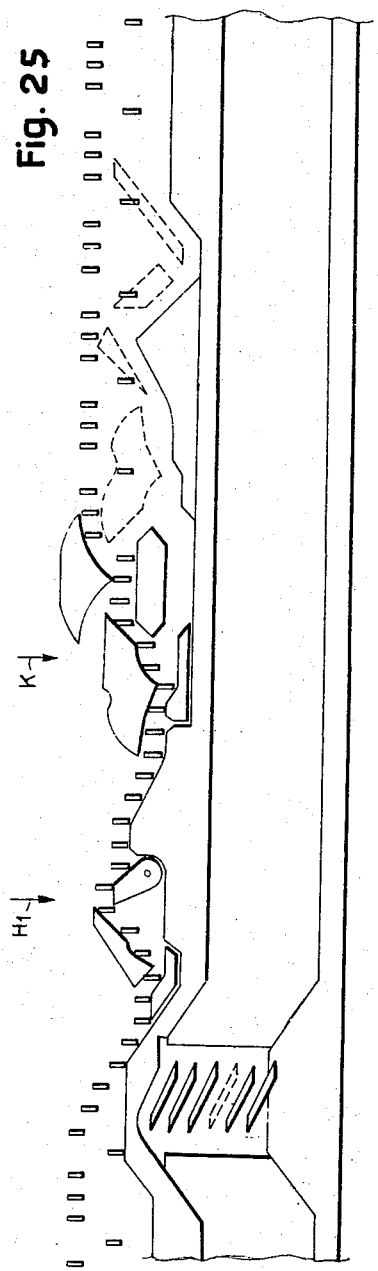

United States Patent Office 3,004,414
Patented Oct. 17, 1961

3,004,414
DOUBLE FEED APPARATUS FOR CIRCULAR HOSIERY MACHINE TO PRODUCE PLAIN AND TUCK STITCHES
Giorgio Billi, Firenze, Italy, assignor, by mesne assignments, to Singer-Fidelity, Inc., Philadelphia, Pa., a corporation of Delaware
Filed Apr. 23, 1957, Ser. No. 654,505
Claims priority, application Italy Apr. 27, 1956
8 Claims. (Cl. 66—50)

This invention concerns an apparatus to be applied to a circular knit hosiery machine to produce tuck stitches and plain stitches.

The apparatus is especially intended to be attached to a machine set up to produce plain stitches so that the machine also produces tuck stitches. Conventional circular knit machines for producing plain stitches generally include a thread feed at a first position, having suitable control cams operatively associated therewith. The apparatus according to the invention includes a novel arrangement of additional cams for controlling jacks and needles in the machine to determine the selection of jacks and needles required to form plain or tuck stitches. The apparatus operates by releasing stitches in a group of needles in an alternative manner. The additional cams are arranged in position spaced from the first thread feed position and the control cams associated therewith. According to the invention there is further provided a second thread feed spaced from the first mentioned thread feed position. At the second thread feed, the thread may be formed into plain or tuck stitches.

The additional cams are controlled by auxiliary cams rotated cyclically with respect to a rotating needle cylinder in the machine. The jacks and needles are arranged in two adjacent arcuate arrays which together define a complete circle. The jacks have butts of two different lengths and are arranged in a number of rows equal to a number of cycles in which different needles are alternately released. The apparatus is supplied with thread feed guide means cooperating with suitable clamps arranged on a dial plate over the needle cylinder. The apparatus is further supplied with control means for sinkers radially movable in the machine in connection with the thread feeds for forming the plain and tuck stitches.

It is therefore an object of the invention to provide an apparatus for converting a circular knit hosiery machine producing plain stitches to produce both plain and tuck stitches in a predetermined cyclical fashion.

It is a further object to provide an apparatus of the character described with cams operatively associated with a supplementary thread feed means for forming tuck or plain stitches.

Another object is to provide an apparatus of the character described with a circular arrangement of two arcuate groups of jacks having butts of different lengths, the butts being disposed in different rows.

A further object is to provide novel control means for an apparatus adapted to convert a circular knit plain stitch hosiery machine to produce both plain and tuck stitches.

The invention will be better understood in connection with the following description taken together with the drawings, wherein:

FIGS. 3 and 4 are perspective views of an annular cam used for control purposes in the apparatus.

FIGS. 5, 6 and 7 are sectional views taken on lines V—V, VI—VI and VII—VII of FIG. 3.

FIG. 10 is a diagram illustrating the development of six auxiliary cams employed in the apparatus.

FIGS. 11 and 12 are diagrams illustrating arrangements of jacks and needles respectively employed in forming the tuck stitches.

FIGS. 13–16 are diagrams illustrating the positioning and operating of various cams affecting the needles and jacks.

FIG. 17 is an elevational view of a portion of the apparatus shown in FIG. 8 showing the needle cylinder in section.

FIGS. 18 and 19 are end views of a drum support for cams employed in the apparatus.

FIGS. 22–25 are diagrams showing different positions of cams employed in the apparatus of FIGS. 20, 21.

Figure 1:
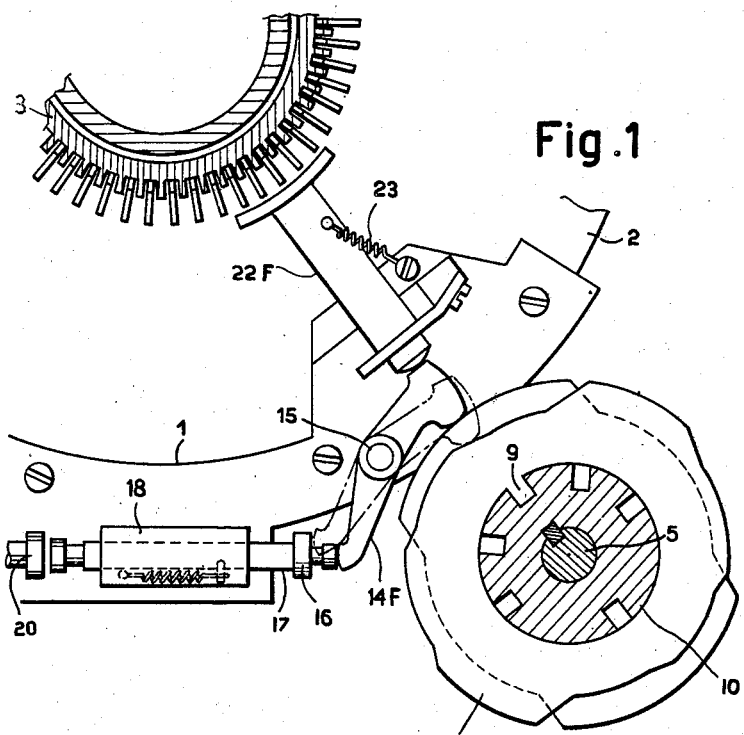
FIG. 1 is a fragmentary plan view partly in section of one embodiment of the invention.
Figure 2:
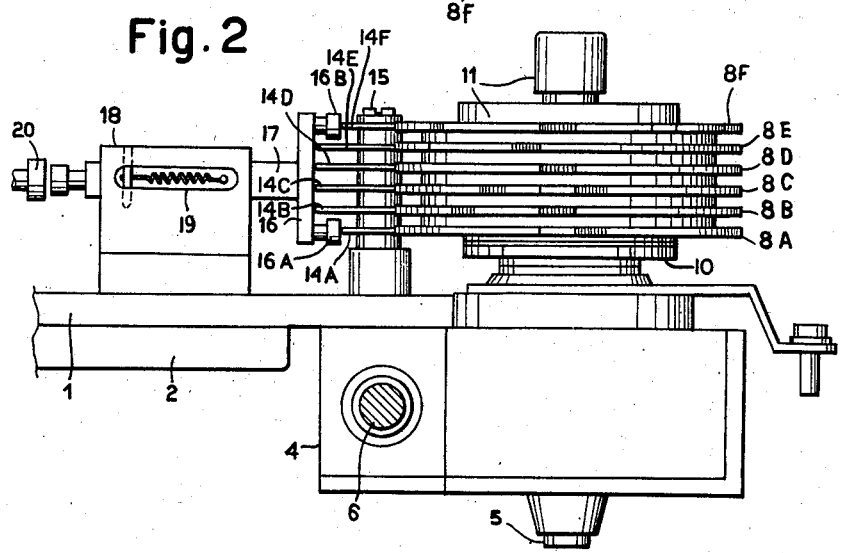
FIG. 2 is an elevational end view partly in section of the embodiment of FIG. 1.

Referring to FIGS. 1 and 2, numeral 1 denotes a support secured to a base 2 circumferentially surrounding a needle cylinder 3 of the machine. Disposed under support 1 is a box 4 in which rotates a vertically disposed shaft 5. The shaft 5 is coupled to another shaft 6 and is driven thereby. Shaft 6 is driven in common with the needle cylinder 3 by drive members in the machine partially shown in FIG. 17. The needle cylinder 3 is driven at such a rate that it rotates eight times for each one revolution of the shaft 5 and cams carried thereby.

Shaft 5 carries six cams 8A–8F. Each of the cams is provided with a tooth or key 9 arranged to be inserted into an appropriate groove of a drum 10. Drum 10 is secured to shaft 5 and is axial therewith. A clamp assembly 11 including a clamp plate and cap, clamps the cams in relatively fixed positions to form a unitary assembly. The assembly of cams is axially movable, in order to disable the controlling action of the cams when required. The cams 8A–8F are herein designated auxiliary cams. They are intended to effect continuous control when required of certain additional cams 22A–22F which operate on the butts of jacks in the machine. Only cam 22F is visible in FIG. 1, the other cams being underneath and shown diagrammatically in FIGS. 13–16.

For clarity of the following description, the cams are arbitrarily divided into sixteen equal divisions or portions occupying 22½° of arc each and numbered 1 through 16 as shown in FIG. 10. Since the needle cylinder 3 rotates eight times for each one revolution of the shaft 5 and assembly of cams 8A–8F, each of the arbitrary cam divisions or portions corresponds to one-half of a revolution of the needle cylinder. Thus, the sixteen divisions of the assembly of cams correspond to sixteen half revolutions or eight full revolutions of the needle cylinder.

Cams 8A–8F control corresponding hammers 14A–14F, respectively, pivoted on a post 15 on support 1. An end of each of four hammers 14B–14E contacts a cross beam or bar 16 of a slide 17. Slide 17 is horizontally guided in a support 18. The slide is urged in one direction, to the left in FIGS. 1 and 2, by tensioned springs 19, and is moved in the opposite direction, to the right, by thrust member 20. The cross beam 16 is provided with two extensions 16A and 16B near opposite ends thereof. These extensions contact the ends of two outer hammers 14A and 14B respectively. The other ends of all the hammers 14A–14F contact profiles of the respective cams 8A–8F with which the hammers are respectively in coplanar disposition. The other ends of the hammers are enlarged as shown in FIG. 1 so that they can contact cams 8A–8F and the proximal ends of cams 22A–22F. The latter cams are designated collectively by numeral 22 in FIGS. 13–15. Each of these cams 22 has an expanded sloped profile for acting on the butts of jacks described below. Each of cams 22 has a slidably mounted shaft radially disposed with respect to the needle cylinder and normally retracted by a spring 23. The cams 22 are urged inwardly radially of the needle cylinder 3 by the selective operation of the hammers 14A–14F against the tension in the springs 23.

Referring to FIGS. 3 to 7, there is shown an annular cam structure which controls sinkers required to be moved radially in order to bring a thread or yarn to a group of needles in a feed zone or position in the machine. The cam structure includes an annular block 28 provided with an annular track 29. The track has a profile 29a, 29b adapted to radially move sinkers which are assembled on a body overlying the needle cylinder 3 at a thread feed zone. The relative angular position of the annular block 28 with respect to the cams 22 is determined by two adjustable threaded stops 30, 31 assembled on two extensions 32, 33 of the block 28. The stops 30, 31 cooperate with a stop member (not shown) on the structure of the machine.

According to the invention, block 28 is provided with a second group of profiles adapted to set the sinkers back radially at a free zone of a second thread which forms tuck stitches. These profiles are adjustable in position with respect to the cams which control the needles and jacks. The second profiles are adjustable by means of a movable slider 36 and block 37. Slider 36 is movable peripherally in block 28 as best shown in FIGS. 3, 4, 5. A small block 37 is provided which is both peripherally and angularly adjustable in block 28. Block 37 is pivoted on a pin 38 to a slider 39. By adjustment of slider 39 it is possible to effect a circumferential movement of pin 38 and thus of block 37. Block 37 may be moved angularly around pin 38 to a limited extent due to a wide slot or hole in which is disposed a clamping screw 40 threaded in block 28.

By the arrangement described, the positioning of the profiles 29a, 29b may be set by adjustment of the stops 30, 31. The profiles determined by members 36 and 37 may be set by selective adjustment of these members.

Figure 8:
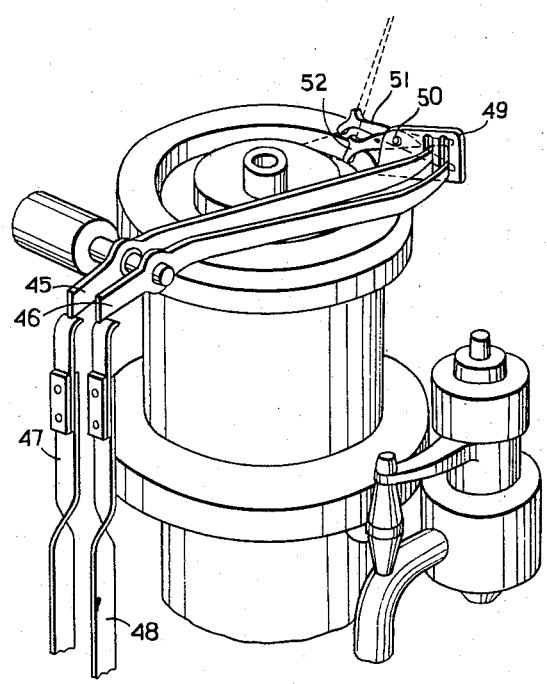
FIG. 8 is a fragmentary perspective view of a control device employed in the apparatus.
Figure 9:
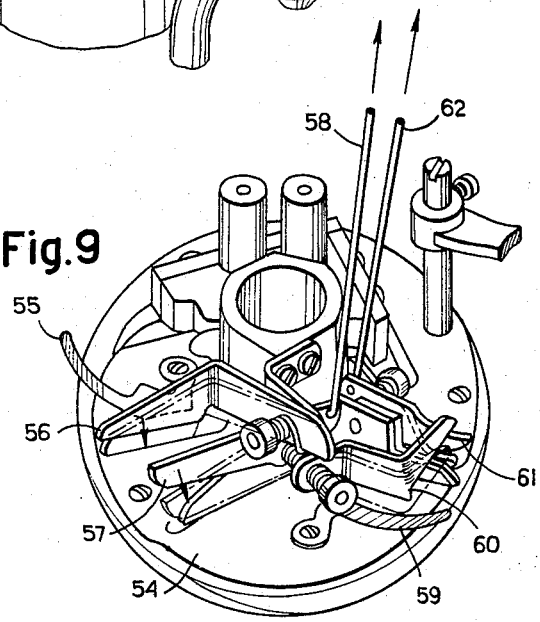
FIG. 9 is a fragmentary perspective view illustrating certain details of a dial plate and thread feed means employed in the apparatus.

In FIGS. 8 and 9, there are shown the devices which accomplish the supplementary feed of thread or yarn in the zone where the tuck stitches are formed. Two levers 45 and 46 are pivotally mounted on a stationary support. The levers pivoted against tension in springs in the stationary support. Two twisted stems or rods 47, 48 engage and pivot the levers 45, 46. The rods are actuated via suitable transmission means not shown in the drawing to pivot each lever once for each complete cycle of operation during which a stocking or other article is fabricated by the machine. The ends of the levers 45, 46 remote from the rods 47, 48 move in slots of a guide plate 49 borne by the machine structure.

Two rocker thread guides 51, 52 are pivoted on a pin 50 carried by plate 49. The thread guides are fed or supplied with threads or yarns indicated by dotted lines in FIG. 8. The guides 51, 52 are engaged by the ends of the levers 45, 46 inserted in the slots in plate 49. The guides may be raised by the levers to withhold or stop the feed of thread and may be lowered to effect the feed of thread, that is, to bring the thread to needles which are raised in the needle cylinder as hereinafter described. The control arrangement of the thread guides 51 and 52 is such that they are operated immediately after fabrication of an article, such as a stocking, is started to provide for the formation of a welt.

Referring to FIG. 9, there is shown a dial plate 54 on which according to the invention there are provided two spring clamps. These clamps as best shown in FIG. 17 have free ends angularly offset to the plane of plate 54. Their inner ends are secured by screws to the plate. The clamps tension threads which pass thereunder. One of the threads forms plain stitches and the other forms tuck stitches. Shears 57 and 61 are provided for cutting the two threads. A retaining pincer 56 is mounted on a bracket to pivot against spring tension. The movable jaw of shear 57 is also pivotally mounted to pivot against spring tension. A rod 58 simultaneously controls movement of the pincer 56 and shear 57. This rod may be raised as indicated by the arrow in FIG. 9 against spring tension to lower the pincer and shear for cutting the thread or yarn employed to produce plain stitches. Clamp 59 serves to stop the thread or yarn temporarily before it is picked up and serves to stop temporarily the second thread which produces tuck stitches before it is picked up by the needles. Pincer 60 is mounted to pivot against spring tension to engage the second thread and the movable shear member 61 cuts the second thread. Member 61 also pivots against spring tension. Rod 62 is operatively connected to pivot pincer 60 and shear member 61. The rod 62 is actuated against spring tension in the direction indicated by the arrow in FIG. 9 to operate the pincers 60 and shear member 61.

In FIGS. 11 and 12, two arrangements of needles and jacks are shown. In FIG. 11, needles 101 have short butts and needles 102 have long butts. Jacks 206–209 are shown arranged in groups of four jacks which are repeated in an arcuate or semicircular array. In another semicircular array are groups of jacks 210–213. The jacks 210–213 are located at or under the needles 102 having the long butts, while the jacks 206–209 are located at or under the needles 101 having the short butts. The last jack 209S at the end of a semicircular array adjacent to the first jack 210 has a longer bottom butt than the other jacks 206–209 for a purpose to be described. More or less than four jacks may be included in each group of jacks depending on the character of the fabric to be formed.

In FIG. 12, the jacks are formed somewhat differently from those shown in FIG. 11 for making other than simple tuck stitches. In FIG. 11 the butts of the jacks are arranged in six horizontal spaced rows which correspond to the six cams 8A–8F, shown in FIG. 2. All the jacks have butts in the first or lowermost row (8A) corresponding to cam 8A, and in the sixth or uppermost row (8F) corresponding to cam 8F. The intermediate rows or butts from the second to the fifth rows (8B–8E) include a butt for every four needles. In the fifth row of butts (8E) there are provided long butts for the jacks 206 and short butts for the jacks 210. The long butts of jacks 207 and the short butts of jacks 211 are located on the fourth row of butts (8D). The long butts of jacks 208 and the short butts of jacks 212 are located on the third row of butts (8C). The long butts of jacks 209 and the short butts of jacks 213 are located on the second row of butts (8B). The intermediate long butts between the lowermost and uppermost butts of the groups of jacks are longer than the short butts of the associated needles and the intermediate short butts are shorter than the long butts of the associated needles. The shortest butts of the jacks in the sixth row (8F) are comparable in length to the short butts of needles 101. The butts in the sixth row (8F) have four progressively decreasing lengths in the groups of four jacks 210–213 located under the needles 102. In the first row of butts (8A) the butts of the jacks are alternately long and short along the semicircular array of the needles 101, except for the one jack 209S. In the semicircular array of needles 102, jacks 210 and 211 have the shortest butts in the first row (8A), jacks 212 have longer butts and jacks 213 have the longest butts.

Referring to FIGS. 13 to 16, arrows H and K indicate two thread feed positions or zones. Arrow H represents one thread feed position at the location of cams 22 which operate to form tuck stitches. Arrow K represents a second thread feed position conventionally provided in a circular knitting machine of this character at which plain stitches are formed in conventional manner. For the latter purpose there is provided a cam 81 which cooperates with additional cams 82–86. At 87 is shown the profile of a control cam plate which guides the uppermost or upper end butts of the jacks in the sixth row of butts (8F). At 87a is shown the profile of a control cam plate which guides the lowermost or lower end butts of the jacks in the first row of butts (8A). Profiles 87 and 87a are raised at the location of cams 22 and at a location immediately before cam 86. In the latter location, there is provided a stationary cam 89 on profile 87a adapted to fully raise the jacks with the longer butts in the first row of jack butts 8A, and the needles cooperating therewith with the longer butts in the first row of jack butts (8A). Cam 89 raises only partially the jacks 206–213 having short butts in the first row of jack butts 8A.

In operation of the apparatus for starting the welt of a stocking (see FIG. 13), the stationary cam 89 is employed. The step of the cam raises the long butts more and short butts less on the first row of jack butts (8A), in order to dispose alternately the needles in two levels. Cams 22 and cam 90 are set back without affecting the thread feed at position H. Cam 84 is inserted to maintain the two levels of the needles and cause the upper needles to pick up the thread at the start of the welt forming operation. The needles are actuated alternately by the cam 86 in advance of the cam 84 to facilitate entry of transfer bits between the needles. After formation of the welt is started cams 8A–8F control the apparatus in such a way that all the cams 22 are completely inserted under and raise all the jacks and thus all the needles at the station H. After at least one revolution of the needle cylinder and in general after not more than five revolutions thereof, cam 90 which has been inserted lowers all the needles. The stitch being formed at the K thread feed position is released from the needle hooks by cams 22. The thread at H feed position forms a stitch because of the lowering of the needles effected by cam 90. When the feed at position K feeds yarn to the needle, a plain stitch is formed by cam 81. Cams 81, 82, 83, 22 and 90 are all employed in the next stage of the cycle which involves formation of the welt; while cams 84, 85 and 86 are excluded (see FIG. 14).

At the completion of the formation of the welt, cam 89 cooperates with cam 86 which lowers the needles of the row selected by cam 89 to allow the transfer bits to clear the initial courses of the welt from the needles at profile 91 (see FIG. 15). The needles then move between the transfer bits.

In order to form the leg of the stocking, the threads are changed to thinner threads at the two feed positions H and K so as to obtain a thinner fabric (see FIG. 16). The tuck stitching aparatus begins a tuck stitch operation. Cams 22 select the needles at each revolution of the needle cylinder. One needle is kept low so as not to be cleared and the other three needles in each group are raised for the clearance or release of the stitches from the needle hooks. The needle which is kept low is changed at each revolution of the needle cylinder in the group of needles. At a first revolution of the needle cylinder in the group of needles. At a first revolution in a cycle the jacks 210 and 206 are kept lowered. At the second revolution jacks 212 and 208 are kept lowered. At the third revolution jacks 211 and 207 are kept lowered. At the fourth revolution, the jacks 209 and 213 are kept lowered, and then the cycle is repeated.

For the formation of a plait type of tuck stitch (see FIG. 12) the cams 22 are controlled in such a manner that at the first revolution of the needle cylinder, the third needle of a group or set of four needles is kept lowered. At the second revolution, the second needle is kept lowered. At the third revolution the fourth needle is kept lowered, and at the fourth revolution the first needle is kept lowered; and then the cycle is repeated.

For the formation of bias stitches, the cams 8A–8F are exposed in order from the bottom to the top with the associated keys 9 arranged as shown in FIG. 18. In FIG. 18, the letters A–F indicate the angular positions where the respective keys are inserted. In FIG. 19, the same letters serve to indicate the locations of the keys of the cams 8A–8F to form the plait type of tuck stitches.

For the formation of the leg of the stocking, cam 90 is inserted and cam 86 is excluded. The thread at feed position H forms a tuck stitch at each revolution of the needle cylinder. Cam 90 forms the stitch. As the needles arrive at the cams 22 (22A–22F) only three needles are raised by the cams. The raised needles clear the thread fed at position K from the needle hooks and take up the thread fed at position H. The needle not raised by the cams 22 also takes up the thread at position H while holding the thread at K which has not been cleared. Immediately thereafter cam 90 lowers all the needles forming the tuck stitch. The thread picked up at K position forms a plain stitch by means of cam 81 after all the needles are cleared by cam 83.

The leg of the stocking is fabricated with plain and tuck stitches both being made at each revolution of the needle cylinder. To form the heel of the stocking the cams 22 and 90 are set back and the thread guides 51 and 52 are raised (see FIGS. 9 and 17) so that there is no thread fed at the H feed position. The heel is formed with plain stitches employing only the thread fed at the K position in conventional manner.

For the formation of the sole of the stocking with a split at the end of the heel, cam 90 is employed and the thread feed is effected by lowering thread guides 51, 52. Cams 22 are employed to perform selection of the needles for forming tuck stitches. The cams 22 raise the needles 101 having the short butts to which correspond the jacks having the long butts in the four intermediate rows (8B–8E). The hammers 14B–14E actuate the appropriate cams 22B–22E for this purpose.

For the formation of the toe of the stocking, drum 10 which supports cams 8A–8F is moved axially. Cams 22 are deactivated and cam 90 is withdrawn and no thread is fed at the H feed position. Plain stitches are formed in conventional manner at the K position. The needles having short butts which are located along a semicircular array of needles and the needles having long butts which are located along an adjacent semicircular array of needles are all controlled by cams 81–86 to form plain stitches.

In order to form tuck stitches according to the invention, the selection of jacks is effected in the following procedure. All of the needles enter the second station at the tuck level. Jack 206 is raised by cam 22E inserted under control of portion 16 of cam 8E (see FIG. 10). During the first half revolution of the needle cylinder 3, when the semicircular array of jacks 206–209 is disposed in front of cams 22, and while the needle associated with jack 209 is tucking and the needle associated with jack 210 is knitting plain, cam 22E follows the profile of portion 1 of cam 8E. When the second semicircular array of the jacks 210–213 reaches cams 22, jack 210 is then not raised by cam 22E and thus the corresponding needle remains at tuck level and is not cleared of thread, to thereby tuck. In this second half revolution cam 22E is withdrawn further owing to a control exerted by portion 2 of cam 8E. When the first semicircular array of jacks returns into registry with portion 3 of cams 8A–8F, jacks 206 are no longer raised. Under these conditions, cam 22F goes up the rise of portion 3 of cam 8F. At the next half revolution of the needle cylinder when the second semicircular array of jacks is at portion 4 of cams 8A–8F, cam 22F raises jacks 210 which are provided with long butts passing the butts of the jacks 212. The jacks 210 are once again raised and they restart a plain stitch, that is, they clear the stitch from the needle hook in the fourth half revolution corresponding to portion 4 of the cams 8A–8F. In this half revolution, cam 22E passes the low butts of jacks 210, and since the butts of jacks 206 are long, cam 22E picks them up and raises them. Cam 22E is then completely inserted because of the rise of cam 8E at cam portion 5. Cam 22E in the cam portions 6, 7 and 8 is always inserted thus always clearing the needles of jacks 210 and 206.

After the third half revolution of the needle cylinder corresponding to cam portion 3, cam 22C follows the cam portion 3 of cam 8C effecting same operation as cam 22E in following portion 1 of cam 8E. Cam 22F coordinated with cam 22C effects the same operation in following the cam portion 5 of cam 8F as occurs with cam 22F at the cam portion 3 of cam 8E. Cam 8F because of its rise occurring at portion 5 effects an approximate 3 mm. traverse or feed of the cam 22F as compared with the approximate 4 mm. feed effected by the rise at cam portion 3 of cam 8F.

Cam 22D effects the same operation with cam 8D in following the cam portion 5 at the end of the fifth half revolution of the needle cylinder, as performed by cam 22E in following cam 8E at the end of the first half revolution at cam portion 1. Cam 22F is moved by cam 8F in following cam portion 7 corresponding to the seventh half revolution of the needle cylinder. Cam 22F then moves in such a way that in the next portion 8, it operates on the butts of the sixth or uppermost row (8F) of butts of jacks 211 raising them and passing the butts of the sixth row of butts of jacks 213.

Cam 22B operates in following cam portion 7 of cam 8B at the end of the seventh half revolution of the needle cylinder, in the same manner as cam 22E operates in portion 1 of cam 8E in the first half revolution of the needle cylinder. In portion 8 of cam 8B during the eighth half revolution of the needle cylinder, cam 22B effects the tuck stitch with the jacks 213 operating in the same manner as cam 22E operated with portion 2 of cam 8E during the second half revolution of the needle cylinder.

In the ninth half revolution of the needle cylinder, jack 209 effects a tuck stitch. In this half revolution, cam 22A is pushed by the rise of portion 9 of cam 8A so that cam 22A passes all the long butts of jacks 206 and 209 in the first row of butts (8A). At this point in the operation it is not possible to raise the butts in the sixth row (8F) of the jacks 213 by means of the cam 22F. The function of the cam 22F is transferred in this instance to cam 22A controlled by cam 8A. In the tenth half revolution of the needle cylinder, cam 22B passes the short butts of jacks 210 and 213. Cam 22A passes the medium length butts of jacks 212 and raises the longest butts of jacks 213. This clears the thread from the hooks of the needles corresponding to jacks 213. During this tenth half revolution of the needle cylinder, cam 22B mounts on to the rise of portion 10 of cam 8B and passes the short butts of jacks 213. For the next three full revolutions of the needle cylinder, jacks 213 are raised through the action of cam 22B pushed by the rises at portions 11 through 16 of cam 8B.

At the end of the first eight half revolutions of the needle cylinder, cam 22E begins again the operation described for the first half revolution at portion 1 of cam 8E. The entire operation of cam 22E during the first eight half revolutions of the needle cylinder is repeated for the next eight half revolutions, namely, the ninth through sixteenth half revolutions. It will be noted that cams 8A–8F have two identical profiles in which portions 1 through 8 are repeated in portions 9 through 16 (see FIG. 10). Each profile of cams 8A–8F is traversed twice during each sixteen revolutions of the needle cylinder or once during each eight revolutions of the needle cylinder.

It is necessary to avoid defects in the stitches which may be formed when the needles are used alternately due to one needle not being cleared in the quartet of needles. To do this the long butt of jack 209S in the lowermost row (8A) of butts is provided. This butt is longer than the other butts in this row. Jack 209S always forms a plain stitch as a result, instead of a tuck stitch once during every eight revolutions or sixteen half revolutions of the needle cylinder. This insures that all needles are cleared.

In the formation of the plait type tuck stitch fabric, the jacks and needles are arranged as shown in FIG. 12. Cams 8B–8E are offset one with respect to the other as indicated in FIG. 19. This provides the control necessary for forming this type of stitch.

Figure 20:
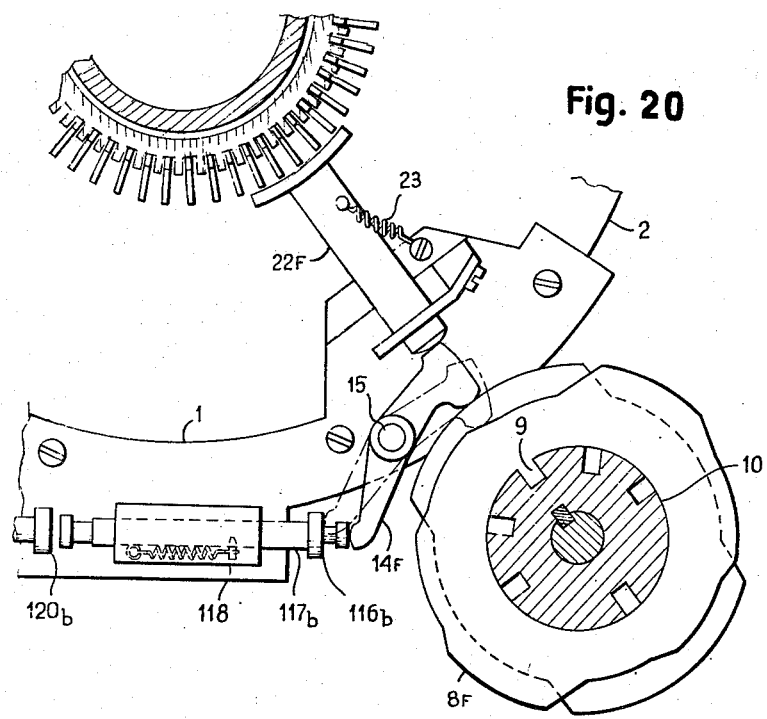
FIGS. 20 and 21 are views similar to FIGS. 1 and 2, respectively illustrating another embodiment of the invention.
Figure 21:
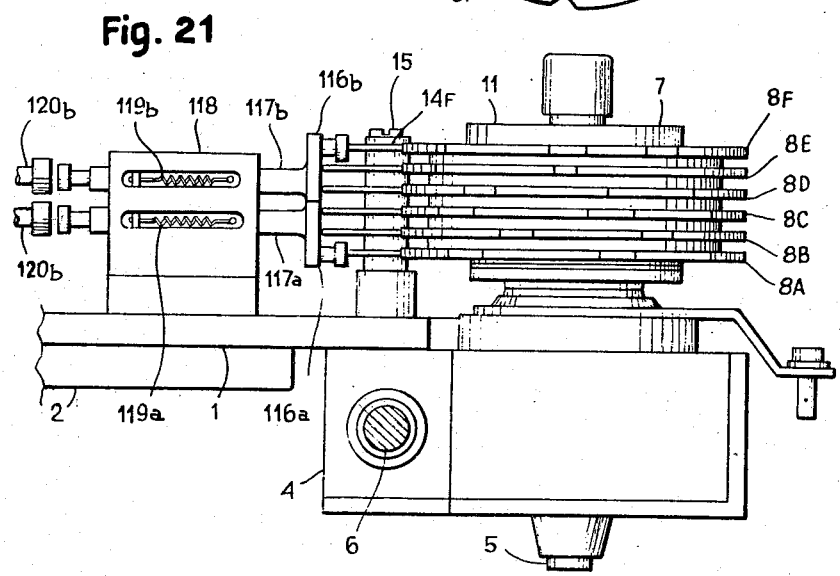

Referring now to FIGS. 20–25, another embodiment of the invention will be described. Reference numerals which are the same as those employed previously refer to corresponding parts. In contrast with the structure shown in FIGS. 1 and 2, hammers 14A–14F are actuated by two cross bars 116a and 116b carried respectively by two slides 117a and 117b guided in the single support 118, as shown in FIGS. 20, 21. The slides are stressed by two sets of springs 119a and 119b to the left as viewed in FIGS. 20 and 21 away from hammers 14A–14F. The slides 117a and 117b are controlled respectively by two thrust members 120a and 120b. The thrust members are controlled like thrust member 20 in FIGS. 1, 2 by the main cams of the machine. In this way the operation of the hammers can be divided in order to determine continuous insertion of the lower sliding cams 22A–22C by means of cross bar 116a and hammers 14A–14C, or to determine continuous insertion of upper sliding cams 22D–22F by means of cross bar 116b and hammers 14D–14F.

Referring to FIGS. 22–25, there are shown the cams 81–86. Cam 90 employed in the previous embodiment is omitted. This cam it will be recalled determined the lowering of the needles selected by cams 22. Instead of cam 90 there is provided cam 150 which cooperates with an angularly movable cam 151. When cam 151 is raised it determines the lifting of all the needles. There is also provided a profile 152 which cooperates with cam 150. Cam 89 provided in the previously described embodiment is omitted.

The thread feed at the K position is provided at the location of cams 81 and 82. The supplementary thread feed at the $H_1$ position is provided at the location of cam 150. As clearly shown in FIGS. 22 to 25, the thread feed at $H_1$ is arranged before cams 22 instead of behind or after the cams as heretofore. During the formation of a welt, the cams 22 select the needles one by one in the desired manner for forming alternate stitches. In order to determine the control of the needles, one by one, slider cams 22A–22C are inserted and determined the lifting of the needles corresponding to jacks 213, 212, 209 and 208, by acting upon the lower long butts of these jacks. In order to determine the insertion of cams 22A–22C there is provided the operating assembly 116a, 117a mentioned above. Referring to FIG. 22, the cam 84 is inserted and the cam 150, 152 is removed. Cam 151 is lowered to start a welt. Under these conditions only the thread at the K feed position is effective. The needles are selected through cams 22 in such a way as to raise one needle and not raise the next needle. The needles are presented on two rows to cam 84 which lowers a portion of the needles allowing one needle to pick up the thread in position K and the next needle not to pick up the thread in position K, to effect the stitch at cam 81. After having thus started a welt, the thread feed is begun at feed position $H_1$ where cam 150 is located.

To form the welt as illustrated by FIG. 23, the initial feed of cam 150 is determined in such a way that the cam may pass the short butts of the needles and begin to lower the needles having the long butts. Meanwhile cam 151 remains lowered. Thus, the stitches are not cleared from the needles. As soon as the lowering of the needle hooks having the long butts is begun due to cam 150, the thread guide which determines the thread feed at $H_1$ is lowered. Then the needles which retain the thread are supplied with thread. After the passage of a certain number of needles, for instance, of ten or fifteen, the start of the thread feed at position $H_1$ is begun, that is, the thread is picked up at position $H_1$ by the needles. Joining of the second thread for about ten to fifteen needles then occurs before the latter begin to form a stitch. When the cam 151 rotates upwardly (see FIG. 23) all needles which form the stitch fed by thread $H_1$ are cleared. A plain type of stitch is then formed. Another plain stitch is formed by all the needles at thread feed position K due to cam 81, all the needles being then raised by cam 83 through the setting back of cam 84. Thus, plain stitches are formed during this entire revolution of the needle cylinder. It is to be noted that the needle selection accomplished through the cams 22A–22C for the selection of needles one by one remains inoperative until formation of the welt is completed.

At the end of welt formation (see FIG. 24) cam 86 is inserted. This cam lowers the needles which have not been raised by cams 22A–22C. The transfer bitts may then be radially inserted in the usual way to connect the body of the first welt to the first formed courses. A plain smooth backing for the welt is subsequently formed through the same arrangement of cams as illustrated in FIG. 23. The backing is formed by plain stitches. When the backing of the welt is completed, the threads are changed for thinner threads to form the leg and other parts of the stocking. If tuck stitches are to be made, cross bar 116a is retracted while cams 8A–8F are made operative so as to determine the needle selection for tuck stitches by which alternately one needle in each group of four needles is kept lowered by cams 22 (see FIG. 25). When tuck stitches are being made, the thread is supplied at position K under control of cam 81. The tuck stitches are then formed only by a portion of the needles. Plain stitches are formed at the $H_1$ thread feed position under control of cams 150, 151.

The heel and toe of the stocking is formed in conventional manner employing only a single thread feed. At the start of the heel, the thread feed in $H_1$ position is interrupted. The following operations occur. Cam 151 is lowered. Approximately ten to fifteen needles pass thread feed position $H_1$ while the thread guide thereat continues to feed the needles without the needles being cleared before the lifting of the thread guide. The thread from the $H_1$ position is thus engaged in about ten to fifteen needles before the thread is severed at $H_1$ position. There is thus an advance in the lowering of the thread guide at $H_1$ position with respect to the lifting of cam 151, and a delay in the lifting of the thread guide with respect to the lowering of cam 151.

In the foregoing description, whenever a conventional circular hosiery machine is mentioned, particular reference is had to the well known Scott and Williams, "Model K" circular hosiery machine. Although the invention has been described with respect to this known type of machine it will be understood that it is applicable to other types of circular hosiery machines, such as those employing short needle cylinders.

What I claim is:

1. In a circular hosiery machine in combination: a rotary needle cylinder; needles and jacks slidably mounted on said cylinder, each jack being formed with two end butts one at each end and an intermediate butt; a support circumferentially surrounding said needle cylinder; first guide means for a first thread feed in a first position on said support; cams on said cylinder registering with said first position for controlling the needles thereat; a second guide means for a supplemental thread feed in a second position on said support angularly spaced from the first position; additional cams slidably carried by said support near said cylinder for selectively controlling the needles and jacks to form tuck stitches and to clear the stitches from the needles; said second guide means being disposed between said first position and said additional cams, continuously rotating auxiliary cams carried on said support and driven in coordination with said needle cylinder to control said additional cams; and another cam disposed between said first and second positions; said other cam determining the selection of needles for forming plain stitches while said additional cams determine the selection of needles for forming tuck stitches.

2. The combination according to claim 1, further comprising a further cam; said further cam being movable adjacent said other cam into operative and inoperative positions; said further cam in operative position determining raising of the needles so as to form plain stitches and to clear the plain stitches from the needle hooks.

3. The combination according to claim 2, further comprising control levers for said second guide means to lower the same in order to start said supplemental feed before said further cam is moved to operative position to clear the plain stitches from the needle hooks; said control levers being operative to delay raising said second guide with respect to moving of said further cam to inoperative position.

4. In a circular hosiery machine in combination: a rotary needle cylinder; needles and jacks slidably mounted in said cylinder; each of said jacks being formed with an end butt at each end and an intermediate butt; the end butts of the jacks being arranged in two end rows across the jacks; each intermediate butt being arranged in one of a plurality of intermediate rows of butts across the jacks; the intermediate butts being of two different lengths on respective jacks; said needles being arranged in two arcuate arrays; the jacks having longer intermediate butts being disposed in alignment with the needles of one of said arrays; the jacks having shorter intermediate butts being disposed in alignment with the needles of the other of said arrays; the needles in the two arrays having their single butts of two different lengths on alternate needles; the needles in said one array having shorter butts and the needles in said other array having longer butts; the butts in one of said end rows being alternately long and short; the butts in the other of said end rows being arranged in groups; each group including butts of three different lengths; a support surrounding said cylinder; profiled cams mounted on said support for acting on said butts; first guide means for a first thread feed in a first position on said support; control cams on said structure for controlling the needles at said first position; additional cams carried by said support to control and select the butts of the needles to form tuck stitches; a second guide means for a second thread feed in a second position on said support spaced from the first position and located between said first position and said additional cams; a rotary auxiliary cam for each of the additional cams; drive means operatively connected to said cylinder and said auxiliary cams for rotating the auxiliary cams through one complete revolution for a predetermined number of revolutions of said cylinder; said auxiliary cams having profiles so disposed with respect to each other as to effect three different movements of said additional cams; certain of said additional cams cooperating only with said intermediate butts; certain of said auxiliary cams having profiles so disposed with respect to each other as to effect different movements of said certain additional cams and consequently different movements of said jacks; another of said additional cams cooperating with said one end row of butts; another of said auxiliary cams cooperating with said other additional cam to determine two positions thereof for selectively moving the butts in said one end row; a further one of said additional cams cooperating with the other end row of butts; a further one of said auxiliary cams having a profile arranged to impose at least four different positions upon said further one additional cam; and still another cam arranged between first and second positions to enable the additional cams to select appropriate butts of the jacks for forming tuck stitches at said first position and for forming plain stitches at said second position.

5. In a circular hosiery machine, the combination according to claim 4, further comprising: a rotatable drum carrying said auxiliary cams; control hammers for actuating said additional cams; said hammers being controllable by said auxiliary cams; and cross bars disposed to act on said hammers to select consecutive groups of said needles for movement; said drum being movable axially to move said auxiliary cams and prevent interference of said auxiliary cams with operation of said additional cams by said hammers.

6. In a circular hosiery machine, the combination according to claim 5, further comprising a still further cam cooperating with said other cam; said further cam being movable between operating and non-operating positions; said further cam in operating position operating, after operation of said other cam to raise certain of said needles for clearing threads from the hooks thereof, to form a plain stitch; and control means for said second guide means in said second position; said control means being effective to move the second guide means and start feeding thread at said second position before said other cam is operated to clear said needles and being further effective to move the second guide means after said certain needles are cleared of thread and said plain stitch is formed.

7. In a circular hosiery machine, the combination according to claim 4, further comprising: an annular cam carried by said cylinder; said cam having a track with a first profile for radially moving thread feed control sinkers carried by a body overlying said cylinder at said first position; said track having a second profile including angularly and peripherally adjustable elements on said annular cam for radially moving the sinkers at said second position.

8. The combination according to claim 1, further comprising: an annular cam on said needle cylinder, said annular cam having an annular track for engaging and radially moving thread feed control sinkers assembled on a body overlying the needle cylinder; said track having one profile for a first radial thrust of the sinkers at the first thread feed position; said track having a second profile for a second radial thrust of the sinkers at the second thread feed position; said second profile being defined by angularly and tangentially adjustable elements on said annular cam.

References Cited in the file of this patent

UNITED STATES PATENTS

| | | |
|---|---|---|
| 1,317,897 | Scott | Oct. 7, 1919 |
| 2,872,796 | Peel | Feb. 10, 1959 |

FOREIGN PATENTS

| | | |
|---|---|---|
| 704,842 | Great Britain | Mar. 3, 1954 |